(12) United States Patent
Louise-Babando et al.

(10) Patent No.: US 8,818,580 B2
(45) Date of Patent: Aug. 26, 2014

(54) INTERACTIVE DIALOG DEVICE BETWEEN AN OPERATOR OF AN AIRCRAFT AND A GUIDANCE SYSTEM OF SAID AIRCRAFT

(71) Applicant: Airbus Operations SAS, Toulouse (FR)

(72) Inventors: Pascale Louise-Babando, Toulouse (FR); Delphine Macdonald, Toulouse (FR); Raphaëlle Ankaoua, Vincennes (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 13/685,880

(22) Filed: Nov. 27, 2012

(65) Prior Publication Data

US 2013/0138272 A1 May 30, 2013

(30) Foreign Application Priority Data

Nov. 29, 2011 (FR) .................................. 11 60885

(51) Int. Cl.
| | | |
|---|---|---|
| G06F 17/00 | (2006.01) | |
| G06F 19/00 | (2011.01) | |
| B64C 13/18 | (2006.01) | |
| G05D 1/06 | (2006.01) | |
| G01C 23/00 | (2006.01) | |
| G05D 1/10 | (2006.01) | |
| G06F 3/0488 | (2013.01) | |
| G06F 3/0362 | (2013.01) | |
| G06F 3/0484 | (2013.01) | |

(52) U.S. Cl.
CPC .............. *G05D 1/10* (2013.01); *G06F 3/04886* (2013.01); *G06F 3/0362* (2013.01); *G01C 23/00* (2013.01); *G06F 3/04883* (2013.01); *G06F 3/04847* (2013.01)
USPC .......... 701/14; 701/487; 340/815.4; 340/945; 340/971; 244/175

(58) Field of Classification Search
USPC ........... 701/1, 3, 4, 7, 8, 11, 14, 36, 400, 411, 701/425, 487; 340/945, 815.4, 815.43, 963, 340/964, 971, 973; 244/75.1, 76 R, 175
See application file for complete search history.

(56) References Cited

U.S. PATENT DOCUMENTS

| | | |
|---|---|---|
| 5,592,198 A | 1/1997 | Fagard et al. |
| 6,072,473 A | 6/2000 | Muller et al. |
| 6,112,141 A | 8/2000 | Briffe et al. |
| 2007/0182590 A1 | 8/2007 | Younkin |
| 2009/0138143 A1 | 5/2009 | Ferreira et al. |

*Primary Examiner* — Thomas Tarcza
*Assistant Examiner* — Edward Pipala
(74) *Attorney, Agent, or Firm* — Lerner, David, Littenberg, Krumholz & Mentlik, LLP

(57) ABSTRACT

The dialog device includes a display screen, on which are displayed three graphic representations, which are respectively associated with the three control axes of the aircraft, each of said graphic representations comprising a plurality of portions, each of which is associated with a guidance mode of the associated control axis, so that all the possible guidance modes of the guidance system are thus represented, this representation highlighting the fact that the guidance modes are active exclusively on a given guidance axis.

15 Claims, 5 Drawing Sheets

INTERACTIVE DIALOG DEVICE BETWEEN AN OPERATOR OF AN AIRCRAFT AND A GUIDANCE SYSTEM OF SAID AIRCRAFT

BACKGROUND OF THE INVENTION

The present invention relates to a dialog device for an aircraft, notably a transport airplane, enabling a dialog between an operator of the aircraft, in particular a pilot, and a guidance system of said aircraft.

Said dialog device is of the type comprising at least one control unit which comprises means for manually selecting the guidance modes and guidance setpoints of said guidance system.

FIELD OF THE INVENTION

It is known that the airplanes that are provided with a guidance system, namely either a flight director which computes piloting setpoints on the basis of guidance setpoints or an automatic piloting system which makes it possible to follow guidance setpoints automatically, are provided with an item of equipment (or control unit), called FCU (Flight Control Unit) on airplanes of AIRBUS type, and MCP (Mode Control Panel) on airplanes of BOEING type, which enables a pilot of the airplane to enter guidance setpoints into the guidance system.

Generally, the pilot chooses a guidance setpoint, then he or she controls the engagement (activation) of the associated guidance mode, so that it takes into account either the value entered (in a so-called "selected" mode), or a value computed by the system according to various criteria (in a so-called "managed" mode).

More particularly, the pilot can notably:
on the speed axis:
  enter a speed (CAS) or Mach setpoint;
  give control to the system so as to use a speed or Mach setpoint computed on the basis of certain criteria;
on the lateral axis:
  enter a heading (HEADING) or route (TRACK) setpoint;
  give control to the system so as to use the route from the predefined flight plan; and
on the vertical axis:
  enter an altitude setpoint;
  indicate how to meet this altitude setpoint:
  by observing a vertical speed or a gradient; or
  by optimizing the climb or descent time while observing an air speed; or else
  by observing a geometrical vertical profile defined by the system according to certain criteria;
  provide a level; and
  follow an axis (of approach for example).

These setpoints are taken into account by the guidance system, either directly as soon their value is modified if the associated mode is active, or after validation (engagement of the associated mode) in the case where another guidance mode is initially engaged. In the latter case, the setpoint is said to be preset before its validation.

For each selection of a setpoint to be reached or to be maintained there is a corresponding guidance mode of the airplane. There is one mode engaged for each axis (speed, lateral, vertical) exclusively. As an illustration, the following modes can be cited:
on the lateral axis:
  capture or maintain a heading mode;
  capture or maintain a route mode;
  join or maintain the trajectory of the flight plan mode;
  capture or maintain an approach axis on a horizontal plane mode; and
on the vertical axis:
  capture or maintain altitude mode;
  reach altitude (climb or descent) observing an air speed mode;
  climb or descent observing a vertical speed or a gradient mode;
  climb or descent observing a geometrical profile or altitude constraints mode; and
  capture or maintain the approach axis on a vertical plane mode.

A synthetic summary of the behavior of the guidance system (flight director or automatic piloting system, associated or not with an automatic thrust control) is produced, generally, on the screens displaying the primary flight parameters, of PFD (Primary Flight Display) type, on a panel of FMA (Flight Mode Annunciator) type. This synthetic summary reviews, generally, the guidance modes that are engaged (active) on each axis (speed, lateral, vertical), as well as the guidance modes that are armed, that is to say those which have been requested by the pilot and which will be engaged automatically when conditions for engaging the mode are satisfied. As an example, outside the trajectory of the flight plan, in maintain heading mode converging toward the trajectory of the flight plan with the join or maintain the trajectory of the flight plan mode armed, the latter mode is engaged automatically on approaching the flight plan.

In most airplanes with two pilots, the control unit of the guidance system is situated in the center of the cockpit (above the screens showing the flight parameters) so that both pilots can access it.

This control unit, for example of FCU type, makes it possible:
  to select guidance setpoints;
  to engage the modes associated with a guidance setpoint (render the mode active), or to request the arming of the mode; and
  to change reference (for example heading rather than route) for a guidance setpoint.

The task of the pilot responsible for the guidance of the airplane is to select the guidance setpoints and modes. Currently, he or she performs this task through the dedicated control unit (FCU or MCP) which is located on the canopy between the two pilots, then he or she has to check the selection of his or her setpoints (values) on the primary flight screen which is located facing him or her (PFD, standing for Primary Flight Display) and/or on the navigation screens (ND, standing for Navigation Display in the lateral plane; VD, standing for Vertical Display in the vertical plane), as does the status of the guidance system through a panel of FMA type which indicates the guidance modes that are armed or engaged on each axis (speed/mach, heading/route, altitude, vertical speed/gradient).

This standard solution presents drawbacks, and in particular:
  the pilot has to select the guidance setpoints and modes in one place (control unit FCU), then check that his or her actions on the behavior of the airplane are taken into account, namely the status of the guidance modes (armed or engaged), in another place on the playback screens, because the control unit itself does not provide exhaustive access to the status of the guidance system. This therefore involves visual toing and froing;
  the control unit does not provide an overview of all the possible guidance modes; and
  this control unit is a physical item of equipment which is difficult to modify (because it is of hardware type).

BRIEF SUMMARY OF THE INVENTION

An aspect of the invention relates to a dialog device between an operator of an aircraft and a guidance system likely to manage guidance modes of the aircraft, according to the three control axes of said aircraft: the speed axis, the lateral axis and the vertical axis, said guidance system using guidance setpoints for the management of said guidance modes, said dialog device comprising at least one control unit which comprises means for manually selecting guidance modes and guidance setpoints.

To this end, according to an embodiment of the invention, said dialog device which is installed on the aircraft is noteworthy in that said control unit comprises, in addition, a display screen, on which are displayed three graphic representations which are respectively associated with said three control axes of the aircraft, in that each of said graphic representations is produced in the form of a graphic assembly, each of said graphic assemblies comprising a plurality of portions, each of which is associated with a guidance mode of the associated control axis, so that all the possible guidance modes of the guidance system are thus represented, and in that the portion relating to a guidance mode that is actually engaged on the guidance system is highlighted on the corresponding graphic representation, this representation highlighting the fact that the guidance modes are active exclusively on a given guidance axis (only one guidance mode can be engaged at a time on a given axis).

Thus, by virtue of an aspect of the invention, the display screen of said control unit provides a representation of all of the guidance modes which can be engaged. This enables a pilot of the aircraft to have a very relevant overview of the status of the guidance system, allowing for a good understanding of the behavior of said system.

In addition, by virtue of another aspect of the invention, the inputs from the pilot to the guidance system (entry of guidance setpoints, request to arm/engage guidance modes, change of guidance reference, as specified below) are done in the same place (on said control unit) as the synthetic playback of the status of the guidance (modes that are armed or engaged and guidance setpoints, as specified below), which makes it possible to avoid the usual visual toing and froing between a dedicated control unit (for example, a control panel FCU or MCP) and a separate screen (for example a PFD screen containing an FMA panel).

Furthermore, the graphic representation mode of this synthetic playback makes it possible to read at a glance the modes that are engaged, by virtue of their predominant specific graphic representation of the modes that are engaged (for example, in a preferred embodiment, the full coloring of the portions of the graphic assembly). This allows for a rapid understanding of the status of the guidance system (unlike a textual playback which involves reading and interpretation, requiring cognitive resource).

Moreover, in a preferred embodiment, each of said graphic assemblies allowing for a complete, simplified and structured visual representation is produced in the form of a semicircular diagram, with portions defined by adjacent circular arcs, that is to say a so-called "half-cheese" diagram.

Furthermore, advantageously, on each of said graphic representations, at least one of the following graphic highlights is produced, in the form of a graph or a graphic animation:
- a particular graphic highlight, for example by means of a thicker outline, of armed guidance modes; and
- a particular graphic highlight of capture modes.

Moreover, advantageously, on at least one of said graphic representations, the value of a guidance setpoint is displayed in the portion associated with the corresponding guidance mode. In this case, preferably, the display of said value is differentiated, for example by a set of colors, according to whether this guidance setpoint value is reached or currently being acquired.

Furthermore, advantageously, when the value of a guidance setpoint is modified using said selection means, a scale relating to this guidance setpoint is displayed, temporarily, on the corresponding graphic representation.

The aim of this display (temporary for the duration of the modification) is to:
- graphically display the selection of the new setpoint value; and
- graphically underscore the status of the setpoint currently being modified, by the fact that the scales are, preferably, different and adapted to each setpoint value.

Moreover, in the case where the guidance system comprises at least one guidance mode (for example a take-off or go-around mode) which becomes priority when particular conditions are satisfied, advantageously, the portion relating to said priority guidance mode is highlighted automatically on the corresponding graphic representation when said particular conditions are satisfied.

Moreover, in a particular embodiment, said dialog device comprises, on said display screen:
- a graphic interaction between portions of two different graphic representations, when the guidance modes corresponding to said portions are linked together; and/or
- at least one interaction means making it possible to make a change of guidance reference (speed/mach, heading/route, vertical speed/gradient) for one and the same guidance setpoint, a change of guidance reference, when it is made, being highlighted on the corresponding portion.

An aspect of the invention therefore relies on a representation of all of the possible guidance modes, by highlighting the fact that the guidance modes are active exclusively on a given axis (just one guidance mode can be engaged at a time on a given axis) with a graphic highlighting of the guidance modes that are active. It enables the pilot to choose a guidance setpoint, to request the engaging (activation) of the associated guidance mode on the defined value (so-called selected mode), or on a value computed by the system according to certain criteria (so-called managed mode), while giving a synthetic playback of the behavior of the guidance system in graphic form. Certain modes pass through an armed state when the engagement is requested until the engagement conditions are satisfied.

In the context of the present invention, said selection means can be produced in different ways.

In a first embodiment, said selection means comprise at least one manual actuation means (or selector) which is arranged on the control unit in proximity to the corresponding graphic representation. This manual actuation means can have different possible forms: rotary selector switch, thumb wheel, etc.

In a second embodiment (as a variant or complementing said first embodiment), said dialog device comprises means for making a direct action on a graphic object representing a portion of a graphic assembly, for at least a guidance mode selection. In this case, advantageously, the display screen presents, at least on the corresponding portion, a graphic animation during the direct interaction.

In this second embodiment:
- in a first variant, said screen is a touch screen, and a selection at least of guidance modes is likely to be made by a direct contact on said touch screen; and in a second variant, said selection means comprise control means linked to the screen and enabling an operator to control the movement of a cursor on the screen, intended for the selection at least of guidance modes.

The dialog device according to an embodiment of the invention, of interactive type, thus makes it possible to provide a synthetic playback of the status of the guidance (modes that are armed or engaged and guidance setpoints), in the same place (control unit) where the pilot can select the guidance setpoints and the guidance modes, which makes it possible in particular to avoid the usual visual toing and froing.

In the context of the present invention, said dialog device can notably comprise a plurality of control units as mentioned above according to an embodiment of the invention, or at least one such control unit and a standard control unit, for example of FCU type.

Another aspect of the present invention also relates to a guidance system of an aircraft, namely a flight director or an automatic piloting system, which comprises a dialog device such as that mentioned above, to enable a dialog between said guidance system and an operator, notably a pilot, of said aircraft.

The present invention also relates to an aircraft, in particular a transport airplane, which is equipped:
with such a dialog device; and/or
with such a guidance system.

BRIEF DESCRIPTION OF THE DRAWINGS

The figures of the appended drawing will give a good understanding of how the invention can be produced. In these figures, identical references designate similar elements.

DETAILED DESCRIPTION

Figure 1:
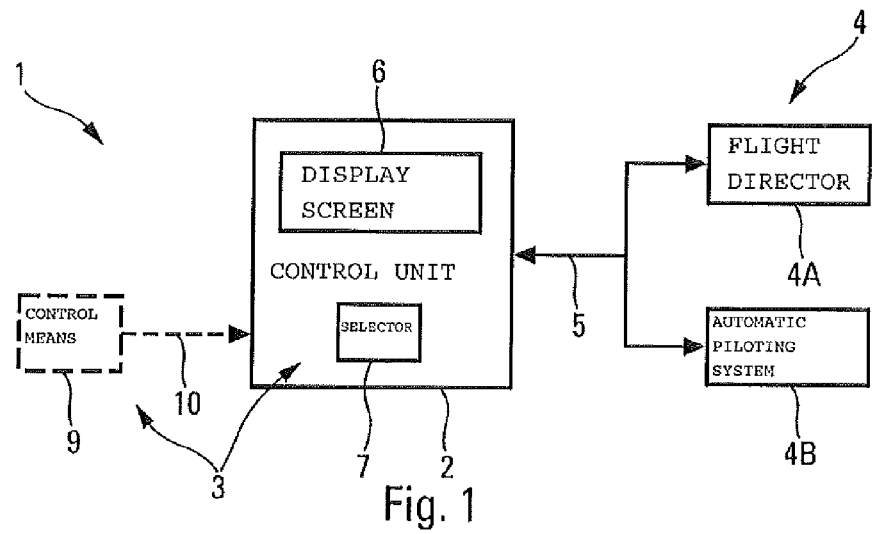
FIG. 1 is the block diagram of a dialog device according to an embodiment of the invention.

The dialog device 1 according to an embodiment of the invention and schematically represented in FIG. 1 is installed on an aircraft, in particular a transport airplane, not represented, and is, preferably, arranged in the cockpit of said aircraft. This dialog device 1 is intended to allow a dialog between at least one operator of the aircraft, notably a pilot, and a standard guidance system 4 of said aircraft.

This guidance system 4 is capable of managing guidance modes of the aircraft according to its three control axes: the speed axis, the lateral axis and the vertical axis, and it uses guidance setpoints for the management of said guidance modes.

Said dialog device 1 which is installed on the aircraft comprises at least one control unit 2 which comprises means 3 for manually selecting guidance modes and guidance setpoints.

Said control unit 2 is linked via a link 5 to guidance means 4A and 4B of said guidance system 4, so as to be able to provide a communication of information between the two assemblies. Said guidance system 4 may comprise, as guidance means:
a standard flight director 4A, which computes piloting setpoints on the basis of guidance setpoints; and/or
a standard automatic piloting system 4B, which makes it possible to follow the guidance setpoints automatically.

Figure 2:
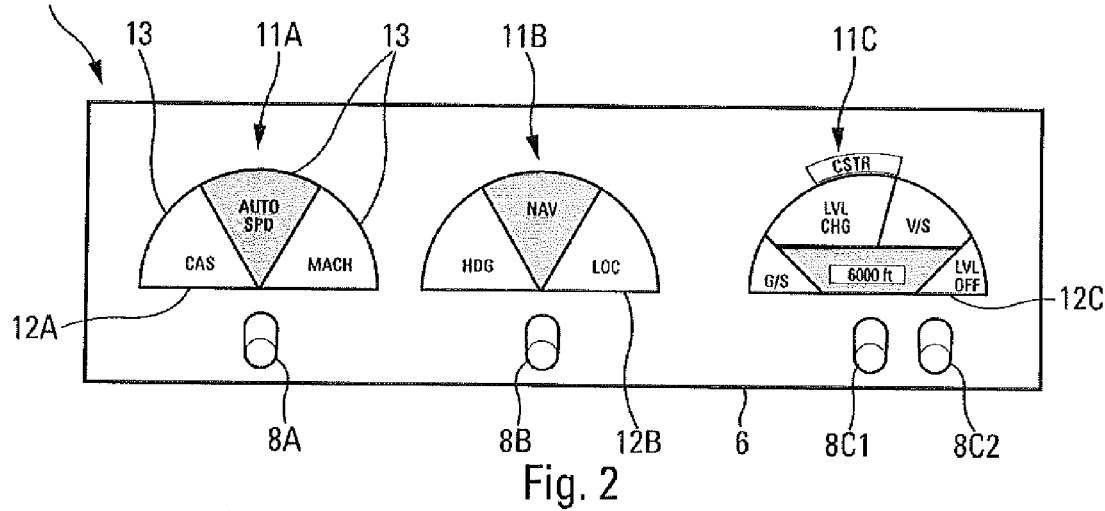
FIGS. 2 to 15 schematically illustrate different actions that can be performed in accordance with various aspects of the invention, by acting on the control unit according to an embodiment of the invention.

According to an embodiment of the invention, said control unit 2 also comprises a display screen 6, on which are displayed three graphic representations 11A, 11B and 11C, which are respectively associated with said three control axes of the aircraft, as represented for example in FIG. 2. Each of said graphic representations 11A, 11B and 11C is produced in the form of a graphic assembly 12A, 12B, 12C, each of said graphic assemblies 12A to 12C comprising a plurality of portions (or graphic forms) 13, each of which is associated with a guidance mode of the associated control axis, so that all the possible guidance modes of the guidance system 4 are thus represented on the screen 6. In addition, the portion 13 relating to a guidance mode which is actually engaged on the guidance system 4 is highlighted on the corresponding graphic representation 11A, 11B, 11C, as illustrated by a shaded portion in FIG. 2 for example.

Thus, by virtue of the dialog device 1 according to an embodiment of the invention, an operator has, on the display screen 6 of said control unit 2, a representation of all of the guidance modes which can be engaged. This enables a pilot of the aircraft to have a complete overview of the status of the guidance system 4, allowing for a good understanding of the behavior of said system 4.

Furthermore, by virtue of an aspect of the invention, the inputs from the pilot to the guidance system (entry of guidance setpoints, request to arm/engage guidance modes, change of guidance reference, as specified below) are done in the same place (on said control unit 2) as the synthetic playback of the status of the guidance (modes that are armed or engaged and guidance setpoints, as specified below), which makes it possible to avoid the usual visual toing and froing between a dedicated control unit (for example a control panel FCU or MCP) and a separate screen (for example a PFD screen containing an FMA panel).

Furthermore, the graphic representation mode of this synthetic playback makes it possible to read at a glance the modes that are engaged, by virtue of their predominant specific graphic representation of the modes that are engaged (for example, in a preferred embodiment, the complete coloring of the portions of the graphic assembly). This allows a rapid understanding of the status of the guidance system 4 (unlike a textual playback involving reading and interpretation, requiring cognitive resource).

The device 1 is therefore indeed a dialog device with a transmission of information in both directions, namely the selection of modes and of setpoints from the control unit 2 to the guidance system 4 and the indication of the status of the system 4 to said control unit 2 for its playback on the screen 6.

Moreover, each of said graphic assemblies 12A, 12B and 12C makes it possible to group together, visually and formally, the modes associated with the corresponding axis (speed, lateral, vertical), and thus allows for a complete, simplified and structured visual representation. In a preferred embodiment (represented in FIGS. 2 to 15), each of said graphic assemblies 12A to 12C is produced in the form of a semicircular diagram, with portions 13 defined by adjacent circular arcs, that is to say a so-called "half-cheese" diagram, in which each portion 13 represents a guidance mode that can be engaged.

Figure 12:
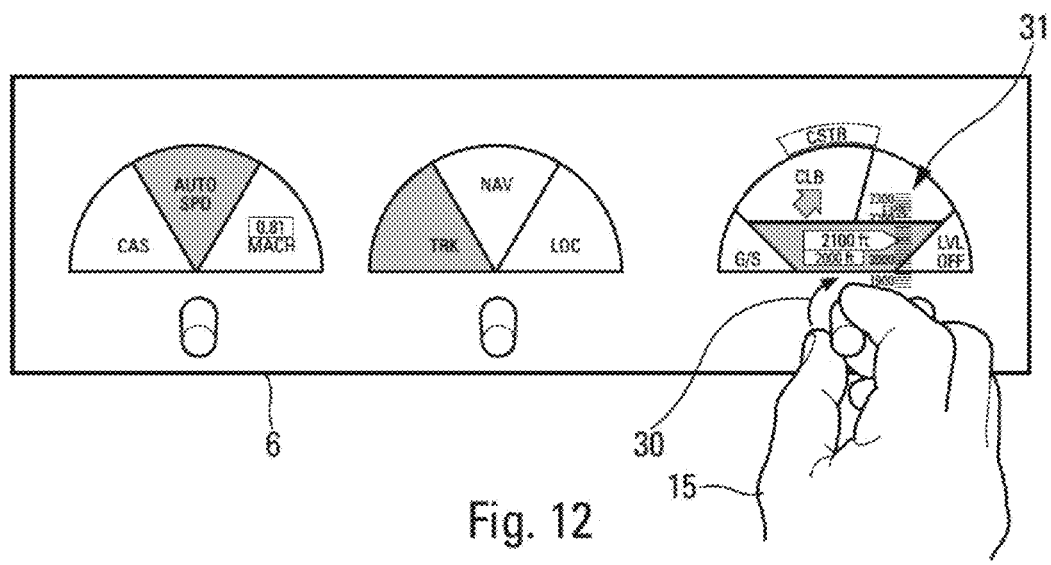

Each representation (portion 13) of a possible guidance mode can contain:
a single textual label (for example CAS); or
a context-oriented textual label according to the relative status of the aircraft in relation to the guidance setpoint, for example a portion 13 representing the change of altitude level modes of the graphic assembly 12C is assigned a label DES (for descent) or CLB (for climb) in FIG. 12 for example, or LVL CHG (for level change) in FIG. 2 for example, on the basis of the chosen setpoint altitude value or reference value (for example, it is possible to have in the same portion 13 the label HDG (FIG. 2) for the heading if the guidance reference is a heading or the label TRK (FIG. 12) for the route if the guidance reference is a route for the lateral axis).

This contextual interface can be adapted to the flight phase suggesting mode activations. For example, the interface can make it possible to activate the approach mode once the approach is specified in the system (selection of runway and type of procedure being flown), or suggest the use of the or each possible climb mode when the altitude setpoint is greater than the current altitude of the aircraft.

By virtue of the control unit 2, the pilot can in particular:
on the speed axis:
enter a speed (CAS) or Mach setpoint; or
give control to the system so as to use a speed or Mach setpoint computed according to certain criteria (so-called "automatic" or "managed" mode).

Consequently, in the preferred embodiment represented in FIGS. 2 to 15, the graphic assembly 12A relating to the speed axis comprises three portions 13 (or graphic forms) corresponding to the following three guidance modes that are possible (and that can be engaged exclusively): CAS, MACH and AUTO SPD (namely "auto-speed" for the so-called "automatic" or managed mode);

on the lateral axis:
enter a heading (heading) or route (track) setpoint; or
give control to the system so as to use the route from the predefined flight plan or a defined approach axis.

Consequently, in the preferred embodiment represented in FIGS. 2 to 15, the graphic assembly 12B relating to the lateral axis comprises three portions 13 (or graphic forms) corresponding to the following three guidance modes that are possible (and that can be engaged exclusively): HDG for capture or maintain heading (or TRK for capture or maintain route), NAV to follow the flight plan (so-called "automatic" or managed mode), and LOC for the capture or maintain approach "localizer" axis mode (this label being able to be adapted contextually if there is a need to differentiate the type of approach, for example F-LOC for an FLS type approach, etc.); and on the vertical axis:
enter an altitude setpoint;
indicate how to reach this altitude setpoint:
by observing a vertical speed or gradient; or
by optimizing the climb or descent time while observing an air speed; or else
by observing a geometrical vertical profile defined by the system according to certain criteria or certain constraints concerning geographic points (for example: altitude or speed constraint);
provide a level; and
follow an axis (of approach for example).

Consequently, in the preferred embodiment represented in FIGS. 2 to 15, the graphic assembly 12C relating to the vertical axis comprises five portions (or graphic forms) corresponding to the following five guidance modes (or types of mode) that are possible (and that can be engaged exclusively):

a graphic form (or portion) 13 dedicated to the G/S mode for capture or maintain "glide" axis (this label being able to be adapted contextually if there is a need to differentiate the type of approach, for example F-G/S for an FLS type approach, etc.);

a graphic form dedicated to the change of level modes: the textual label LVL CHG is displayed by default when the value of the setpoint altitude is equal to the current altitude value. When these two values are different, the labels CLB or DES are displayed depending on the relative position of the two altitude values (CLB for climb to the setpoint altitude, DES for descent), or any other specific textual label which would be deemed useful (for example CSTR or PROFILE for a constrained climb or descent mode, or taking into account a geometrical profile), or even T0 for take-off or GA for go-around;

a graphic form dedicated to the characterization of the type of climb or descent in V/S for vertical speed (or FPA for the gradient);

a graphic form dedicated to the immediate level LVL OFF; and a graphic form dedicated to capture or maintain an altitude ALT, associated with an altitude value (value selected by the pilot), for example "6000 ft", namely 6000 feet, in FIG. 2.

The control unit 2 notably makes it possible to implement all the functions of a usual physical control unit, for example of FCU type. In the context of the present invention, the selection means 3 of said control unit 2 can be produced in different ways.

In a first embodiment of the dialog device 1, as represented in FIGS. 1 to 15, said selection means 3 comprise a set 7 of manual actuation means 8A, 8B, 8C1, 8C2 (in this case knobs) which are arranged on the control unit 2 in proximity to each corresponding graphic representation 11A, 11B, 11C. Thus, the pilot can, on each axis, interact with the guidance system 4 through a knob (or selector) that he or she can rotate notably to increment or decrement a guidance setpoint value. This selector can have different possible forms: rotary selector switch, thumb wheel, etc.

This interface (control unit 2) makes it possible to control the engagement (activation) of the guidance mode, on the defined value (so-called selected mode), or on a value computed by the system according to certain criteria (so-called automatic or managed mode). For example, in a particular embodiment, an action to pull on a knob 8A, 8B, 8C1, 8C2 (FIG. 3) can make it possible to arm/engage the associated selected mode, whereas an action to push on this same knob 8A, 8B, 8C1, 8C2 can correspond to a request to arm/engage the associated managed mode. For the speed/Mach axis, an action to pull on the selector 8A engages the selected mode SPD (or MACH depending on the reference) and an action to push on the selector 8A engages the mode AUTO SPD (speed setpoint computed automatically by the system 4).

In a second embodiment (as a variant or complementing said first embodiment), said dialog device 1 comprises means for producing a direction action on a graphic object representing a portion 13 of a graphic assembly 12A, 12B, 12C, in order to at least select guidance modes (and possibly select guidance setpoints).

Figure 14:
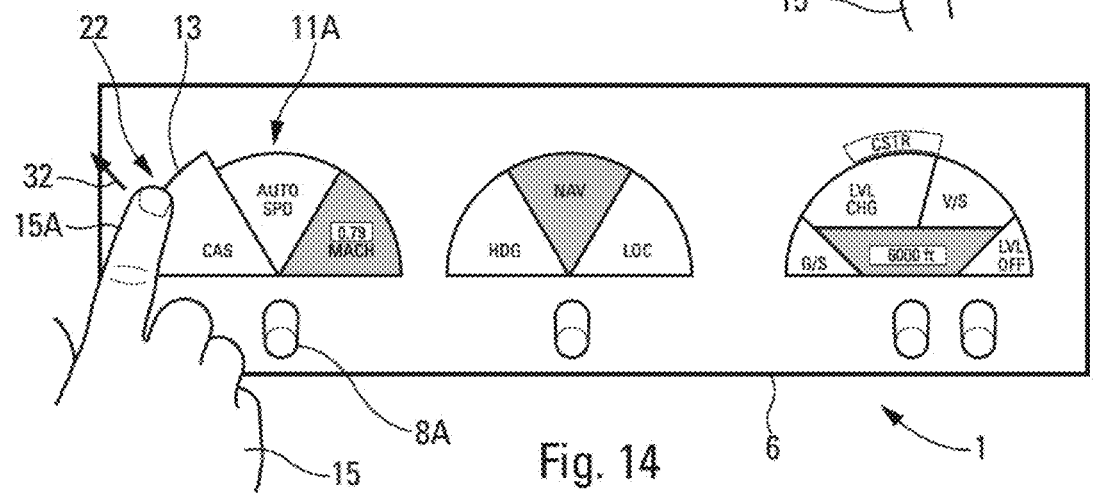
Figure 15:
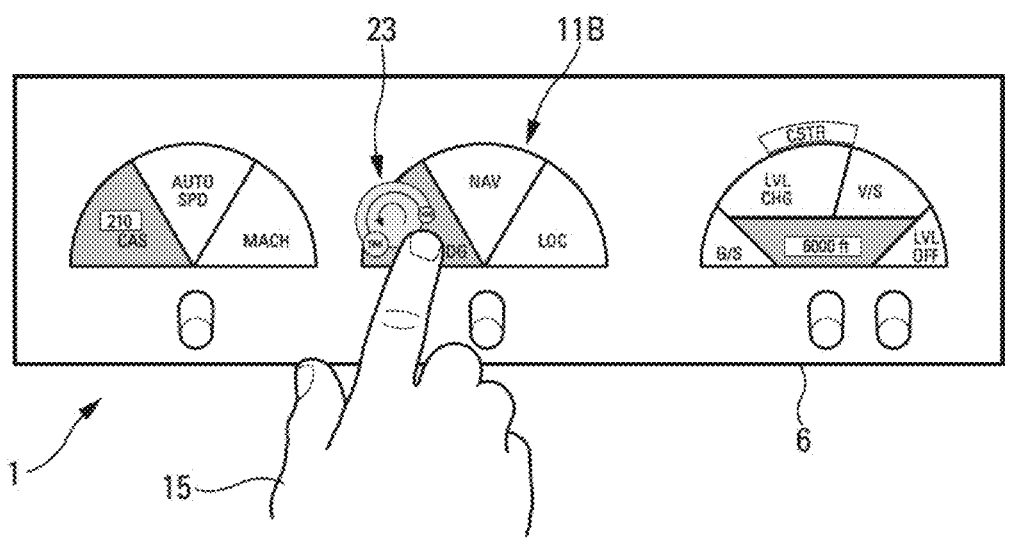

In a first variant of this second embodiment, said screen 6 is a touch screen, and a selection of guidance modes (and possibly of guidance setpoints) is likely to be made by a direct contact with said touch screen 6, preferably (but not exclusively) by a finger contact on the part of the operator, as represented for example in FIGS. 14 and 15.

Furthermore, in a second variant (which can be provided as a complement), said selection means 3 comprise control means 9, represented by broken lines in FIG. 1 to show that they correspond to a possible variant. These control means 9 which are linked to the unit 2 (by a standard link 10 of wired or electromagnetic wave type) can be actuated manually by an operator so as to control the movement of a standard cursor (not represented) on the screen 6, intended to act on graphic objects (which are produced in the form of interaction means) of said graphic assemblies 12A to 12C.

These control means 9 may notably comprise:
- a control trackball;
- a computer mouse; and/or
- a trackpad, or touchpad.

In this second embodiment, the engagement/arming of a mode can be done by direct interaction on a graphic object (by touch or using a pointer).

For example, a direct interaction on a portion 13 can make it possible to arm/engage the mode currently being interacted with. This interaction can be a press/click or a translational movement (FIG. 14) or any other action that can be interpreted by the system.

In this embodiment, a graphic animation is preferably provided during the direct interaction with the graphic objects of the screen 6. For example, it is possible to provide a translational interaction (via the pointer or a finger 15A) on the portion so as to grasp the graphic object and pull it outwards, thus triggering the arming/engagement of the associated guidance mode. During this translational movement, as represented by an arrow 32 in FIG. 14, the portion 13 (in this case CAS) can be stretched dynamically in a homothetic manner following the translation of the pointer or of the finger, as illustrated by reference 22. Thus, the visual animation will accompany the understanding of the validity of the interaction.

Figure 3:
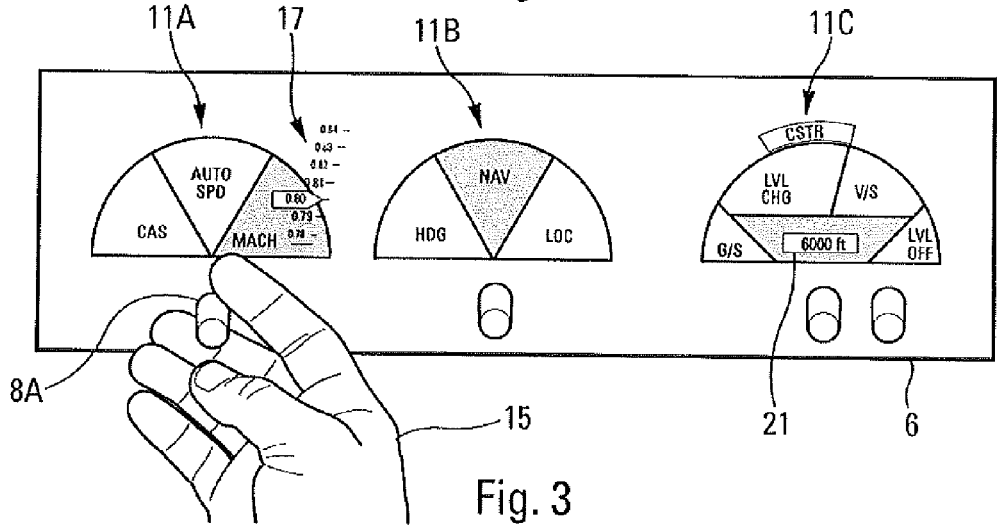
Figure 4:
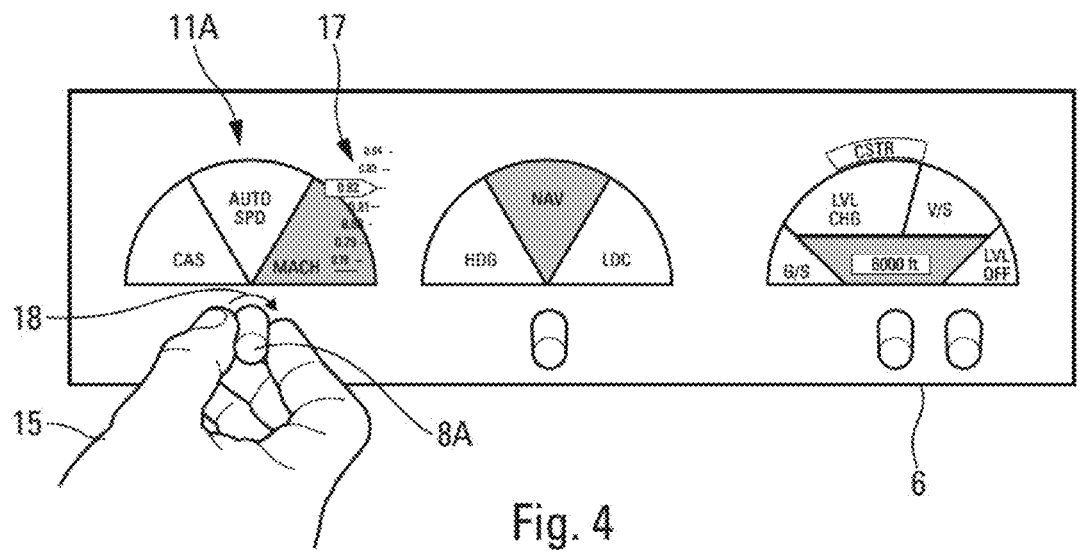
Figure 5:
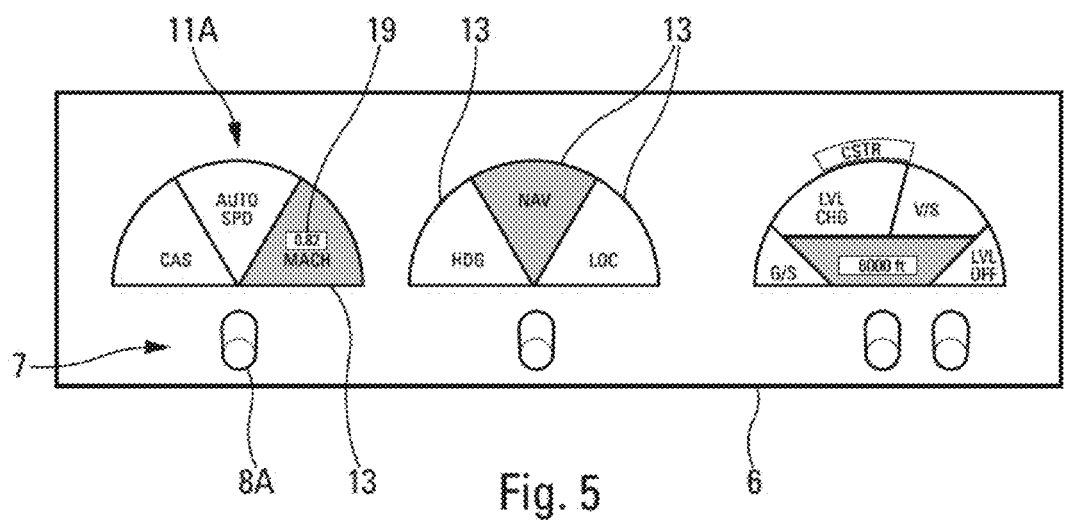

FIGS. 2 to 5 illustrate different successive situations when modifying a guidance setpoint of the guidance system 4, relating to the speed axis, in this case a Mach setpoint. More specifically:

FIG. 2 illustrates the initial situation before a modification of the Mach setpoint, the speed of the aircraft being managed automatically (the AUTO SPD portion is then colored, as illustrated by a shaded area in FIG. 2);

in FIG. 3, an operator, of whom the hand 15 is partially represented, pulls with two fingers on the knob 8A so as to access the MACH setpoint selection function, the corresponding portion 13 of which becomes colored in reality (and shaded in the figure), this action also causing a Mach scale 17 to appear (temporarily) to assist in setting the new setpoint;

the operator then turns the knob 8A with his or her hand, as illustrated by an arrow 18 in FIG. 4, so as to modify the value of the Mach setpoint, as reproduced on the scale 17;

in FIG. 5, the operator has released the button 8A and the new selected value (0.82) is displayed in a label 19 which can be seen in the portion 13 corresponding to the MACH. Preferably, this label 19 is for example in blue for the selected value, and it changes color and becomes, for example, green, when the selected setpoint is reached.

In the context of the present invention, said dialog device 1 can comprise;
- a single control unit 2; or
- a plurality of control units 2 such as the one mentioned above; or else
- such a control unit 2 combined with a different control unit (redundant and dissimilar), for example of FCU or FCU backup (sort of software copy) type, or even with a direct interaction on the guidance information playback screens (PFD/ND/VD), which enables the pilot to have different and partly complementary control means.

The present invention also relates to a guidance system 4 of an aircraft, namely a flight director 4A or an automatic piloting system 4B, which comprises a dialog device 1 such as that mentioned above, to enable a dialog between said guidance system 4 and a pilot of said aircraft.

Moreover, as indicated above, on each of said graphic representations 11A, 11B, 11C, a particular graphic highlight of the guidance modes that are armed is produced in the form of a graph or a graphic animation. For example, the mode or modes that is/are armed can be represented by a thick outline of the same color as the mode that is engaged.

Furthermore, in addition, a particularly graphic representation of the capture modes is produced (when the maintain mode is on the point of being engaged, the screen 6 represents the capture by a graph and/or a graphic animation). For example, the capture mode or modes can be represented by a pulsing thick outline (graphic animation giving the impression of an outline which is breathing) of the same color as the mode that is engaged, as represented for the outline 20 of the NAV portion in FIG. 10.

Moreover, on at least one of said graphic representations 11A, 11B, 11C, the value of a guidance setpoint is displayed in the portion associated with the corresponding guidance mode. For example, it is possible to display permanently (in a label) the setpoint value associated with the mode that is engaged, such as the altitude value (6000 ft (feet)) in the label 21 of FIG. 3. In this case, preferably, the display of said value is differentiated according to whether this guidance setpoint value is reached or currently being acquired. For example, a selected value may be displayed in blue as long as it is not reached, and in green once it is reached.

Furthermore, when the value of a guidance setpoint is being modified using said selection means 3, a scale relating to this guidance setpoint is displayed, temporarily, on the corresponding graphic representation, as represented for example in FIGS. 3 and 4 for the scale 17.

The purpose of this display of a scale (temporary, for the duration of the modification) is to:
- show, graphically, the selection of the new setpoint value: show the incrementation or the decrementation; and
- underscore, graphically, the status of the setpoint currently being modified, by the fact that the scales are, preferably, different and adapted to each setpoint value.

Moreover, in the case where the guidance system 4 comprises at least one guidance mode which becomes priority when particular conditions are satisfied, the portion relating to said priority guidance mode is highlighted, automatically, on the corresponding graphic representation when said particular conditions are satisfied. Furthermore, in this case, the graphic organization of the nominal interface is changed. For example, in the half-cheese representation, the TCAS mode (according to the guidance instructions of the air collision prevention system) may appear semi-overlapping other modes to indicate that it is priority. This particular embodiment can also be applied to other modes considered as priority, such as, for example, the take-off or go-around mode or so-called "last lines of safety" modes.

Moreover, in a particular embodiment, said dialog device 1 comprises, on said display screen 6, a graphic interaction between portions 13 of two different graphic representations 11A, 11B, 11C when the guidance modes corresponding to said portions 13 are linked together. For example, following a specific interaction to request the arming/engagement of the common lateral/vertical approach mode, a particular graphic (and/or an animation) can link the LOC mode of the graphic representation 11B to the G/S mode of the graphic representation 11C.

Furthermore, in a particular embodiment, said dialog device 1 comprises, on said display screen 6, at least one interaction means making it possible to produce a change of guidance reference (speed or mach, heading HDG or route TRK, vertical speed V/S or gradient FPA, meters or feet, etc.) for one and the same guidance setpoint, and a change of guidance reference, when it is made, is highlighted on the corresponding portion. For example, in the fantail representation mode, it is possible to imagine that a pointer (or a finger) performs a rotational movement on the corresponding portion, thus triggering the change of reference of this mode (for example, to switch from HDG to TRK, as represented in FIG. 15). During this rotation, the pointer (or finger) follows a circular arc (with a graphic object 23 which appears at the start of the movement of the pointer) directed towards the desired reference. Thus, the visual animation will accompany the comprehension of the validity of the interaction.

It is also possible to envisage a contextual menu which appears by specific interaction on a mode (for example: click or long press, or any other means) making it possible to select another reference.

Figure 6:
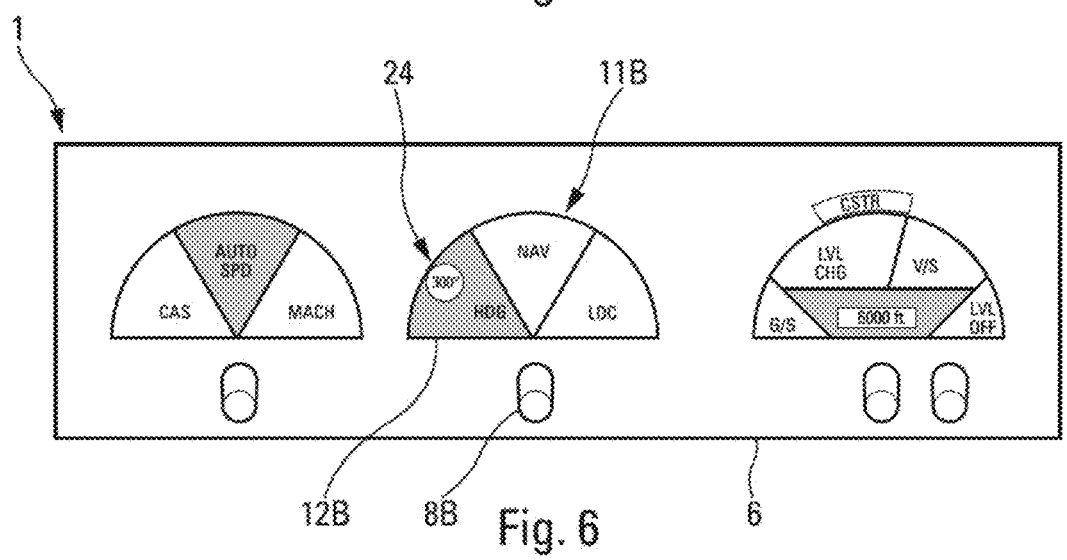
Figure 7:
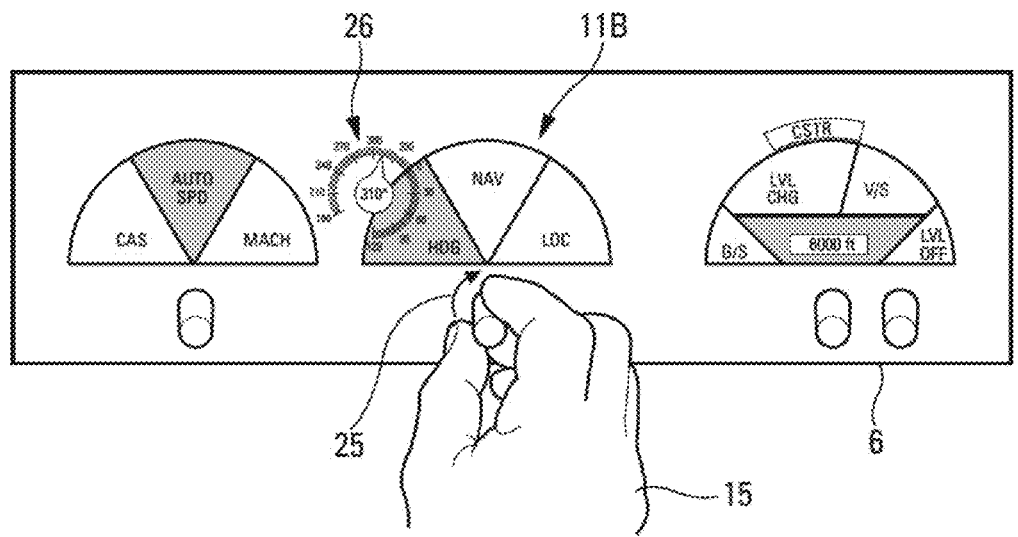
Figure 8:
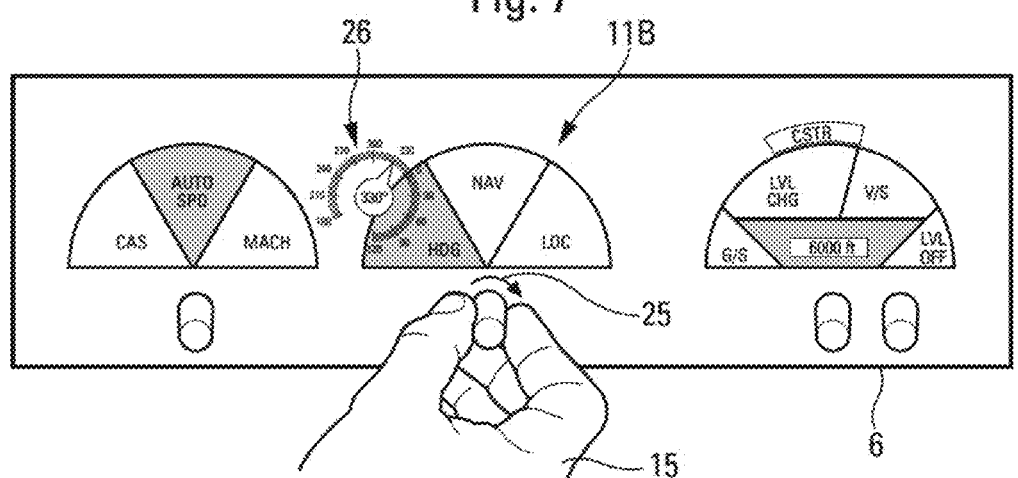
Figure 9:
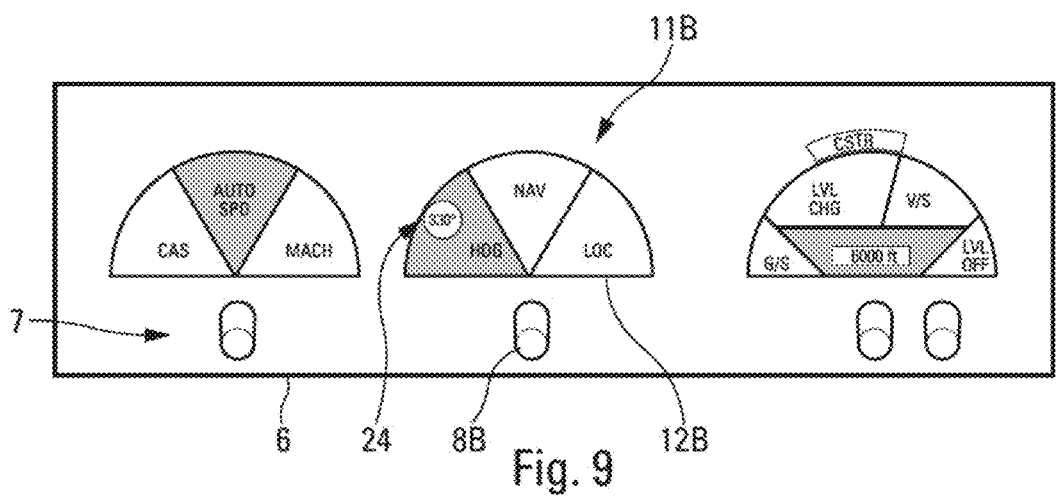
Figure 10:
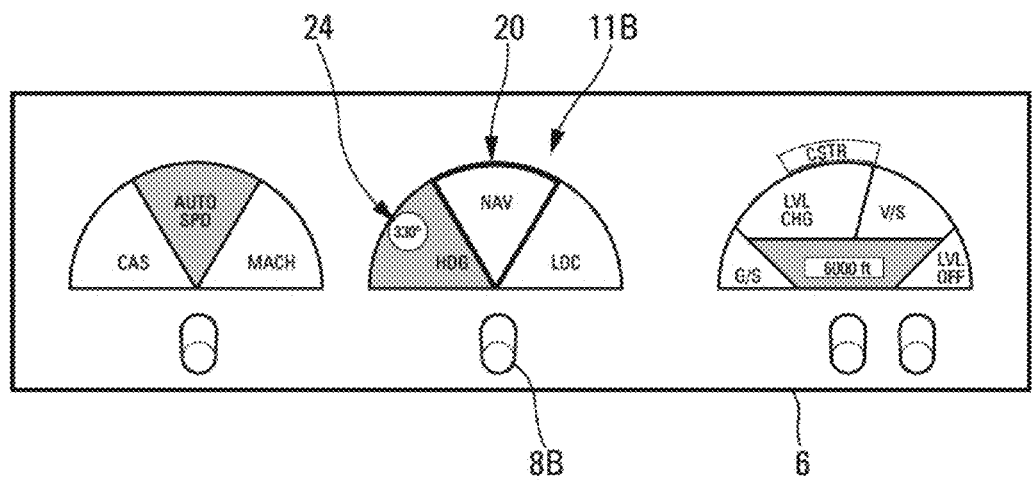

Moreover, by way of illustration, FIGS. 6 to 10 represent different successive situations during the modification of a guidance setpoint of the guidance system 4, relating to the lateral axis, in this case a heading HDG setpoint. More specifically:

FIG. 6 illustrates the initial situation before a modification, the aircraft follows a heading of 300°, a value which is displayed in a label 24, for example a circle in blue;

in FIGS. 7 and 8, an operator rotates the knob 8B with the fingers of his or her hand 15, as illustrated by an arrow 25, so as to modify the value of the heading setpoint, in conjunction with a heading scale 26 (which is displayed temporarily while the modification is being made);

in FIG. 9, the operator has released the knob and the new selected setpoint (330°) is displayed in the label 24 which is shown in the portion 13 corresponding to the heading HDG. Preferably, this label 24 is, for example, in blue for the selected value, and changes color and becomes, for example, green when the selected setpoint is reached (FIG. 10).

The operator can then press on the knob 8B to arm the NAV mode to follow the flight plan. To highlight such an arming, the corresponding portion is made visible, for example, by a thick outline of the same color as the filling of the portion in the engaged state, to illustrate that the engagement request has been taken into account. This thick outline 20 is illustrated in the NAV portion 13 of FIG. 10 (but it can also be any other relevant perceptible rendering). With the same purpose in mind, a capture or join mode can in particular be rendered perceptible by a pulsating or breathing colored outline, giving the impression that the form will be filled completely at the time of the maintain mode.

Figure 11:
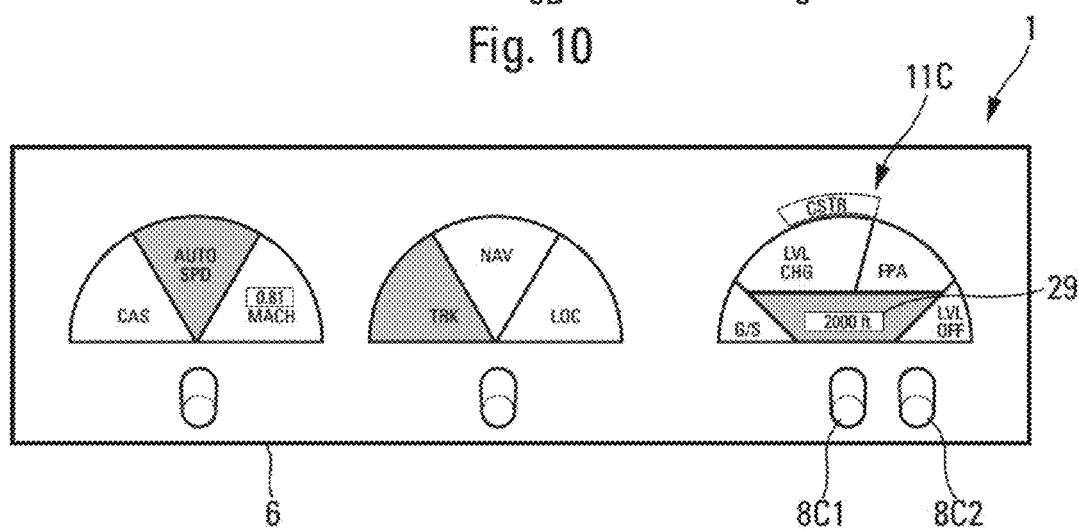
Figure 13:
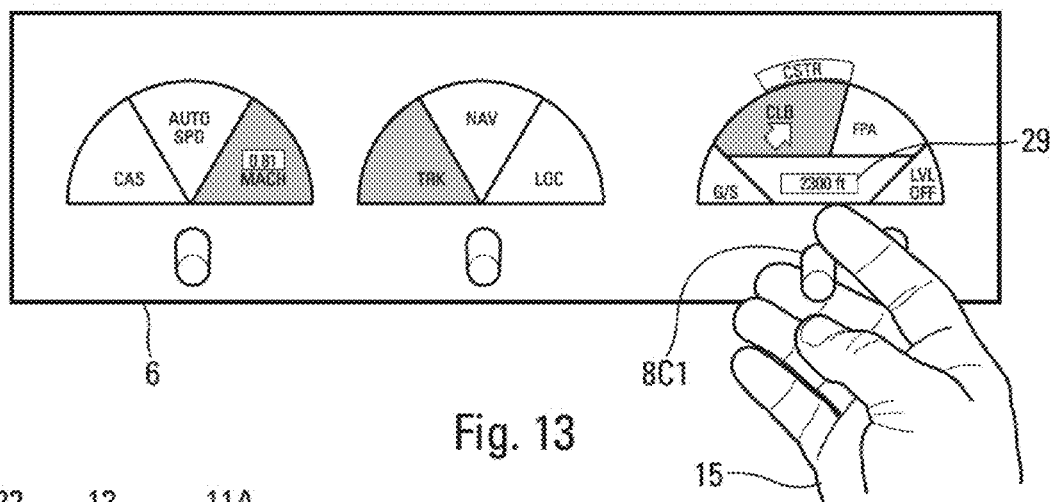

As for FIGS. 11 to 13, they illustrate different successive situations during the modification of a guidance setpoint of the guidance system 4, relating to the vertical axis, in this case an altitude setpoint. More specifically:

FIG. 11 illustrates the initial situation before a modification. The aircraft follows an altitude of 2000 feet (ft), a value which is displayed in the label 29 which is, for example, in green;

in FIG. 12, an operator rotates the knob 8C1 with the fingers of his or her hand 15, as illustrated by an arrow 30, so as to modify the value of the altitude setpoint, in conjunction with an altitude scale 31 (which is displayed temporarily while the modification is being made);

once the operator has released the knob 8C1 and the new setpoint has been selected, the operator can then pull on the knob 8C1 to engage the climb mode CLB to this new altitude, as illustrated in FIG. 13. The new value of the setpoint altitude (2300 ft) is displayed in the label 29 which is shown in the portion 13 corresponding to the altitude. Preferably, this label 29 is in blue for the selected value; and the label 29 changes color and becomes, for example, green when the setpoint altitude is reached.

The dialog device 1 according to the invention, of interactive type, therefore makes it possible to provide a synthetic playback of the status of the guidance (modes that are armed or engaged and guidance setpoints), in the same place (control unit 2) where the pilot can select the guidance setpoints as well as the guidance modes, which makes it possible in particular to avoid the usual visual toings and froings. There is thus a very relevant overview of this status of the guidance system 4, representing:

all the possible guidance modes;

the modes which can be engaged;

the modes that are engaged, with a distinction between a capture mode and a maintain mode;

the implicit comprehension that just one guidance mode at a time can be engaged on an axis;

the modes that are armed;

the guidance setpoints that are currently being reached;

the guidance setpoints that are being maintained;

the guidance setpoints that are currently being modified; and the setpoint values that are accessible to modification.

The invention claimed is:

1. A dialog device between an operator of an aircraft and a guidance system configured to manage guidance modes of the aircraft, said guidance system using guidance setpoints for the management of said guidance modes, said dialog device comprising at least one control unit comprising means for manually selecting guidance modes and guidance setpoints, and a display screen, whereon are displayed first, second, and third graphic representations, wherein said first, second, and third graphic representations are respectively associated with three control axes of the aircraft: a speed axis, a lateral axis and a vertical axis, according to which the guidance system is configured to manage guidance modes, wherein each of said graphic representations is produced in the form of a graphic assembly, each of said graphic assemblies comprising a plurality of portions, each of which is associated with a guidance mode of the associated control axis, so that all the possible guidance modes of the guidance system are thus represented, and wherein the portion relating to a guidance mode engaged on the guidance system is highlighted on the corresponding graphic representation, said graphic representation highlighting the fact that the guidance modes are active exclusively on a given guidance axis.

2. The dialog device as claimed in claim 1, wherein each of said graphic assemblies is produced in the form of a semicircular diagram, with portions defined by adjacent circular arcs.

3. The dialog device as claimed in claim 2, wherein on each of said graphic representations, at least one of the following graphic highlights is produced:

a particular graphic highlight of armed guidance modes; and a particular graphic highlight of capture modes.

4. The dialog device as claimed in claim 1, wherein, on at least one of said graphic representations, the value of a guidance setpoint is displayed in the portion associated with the corresponding guidance mode.

5. The dialog device as claimed in claim 4, wherein the display of said value is differentiated according to whether this guidance setpoint value is reached or currently being acquired.

6. The dialog device as claimed in claim 1, wherein, when the value of a guidance setpoint is modified using said selection means, a scale relating to this guidance setpoint is displayed, temporarily, on the corresponding graphic representation.

7. The dialog device as claimed in claim 1, for a guidance system comprising at least one guidance mode which becomes priority when particular conditions are satisfied, wherein the portion relating to said priority guidance mode is highlighted automatically on the corresponding graphic representation when said particular conditions are satisfied.

8. The dialog device as claimed in claim 1, comprising, on said display screen, a graphic interaction between portions of first and second different graphic representations when the guidance modes corresponding to said portions are linked together.

9. The dialog device as claimed in claim 1, comprising at least one interaction means configured to make a change of guidance reference for one and the same guidance setpoint, and wherein a change of guidance reference, when made, is highlighted on the corresponding portion.

10. The dialog device as claimed in claim 1, wherein said selection means comprise at least one manual actuation means arranged on the control unit in proximity to the corresponding graphic representation.

11. The dialog device as claimed in claim 1, comprising means for making a direct action on a graphic object representing a portion of a graphic assembly, for at least a guidance mode selection.

12. The dialog device as claimed in claim 11, wherein the display screen is configured to present, at least on the corresponding portion, a graphic animation during the direct interaction.

13. The dialog device as claimed in claim 1, wherein said screen comprises a touch screen, and wherein a selection at least of guidance modes is configured to be made by a direct contact on said touch screen.

14. The dialog device as claimed in claim 1, wherein said selection means comprise control means linked to the screen and enabling an operator to control the movement of a cursor on the screen, intended for the selection at least of guidance modes.

15. A guidance system of an aircraft, comprising a dialog device to enable a dialog between said guidance system and an operator of said aircraft, at least for the selection of guidance modes and of guidance setpoints, said dialog device comprising at least one control unit comprising means for manually selecting guidance modes and guidance setpoints, and a display screen, whereon are displayed first, second, and third graphic representations,
- wherein said first, second, and third graphic representations are respectively associated with three control axes of the aircraft: a speed axis, a lateral axis and a vertical axis, according to which the guidance system is configured to manage guidance modes,
- wherein each of said graphic representations is produced in the form of a graphic assembly, each of said graphic assemblies comprising a plurality of portions, each of which is associated with a guidance mode of the associated control axis, so that all the possible guidance modes of the guidance system are thus represented, and
- wherein the portion relating to a guidance mode engaged on the guidance system is highlighted on the corresponding graphic representation, said graphic representation highlighting the fact that the guidance modes are active exclusively on a given guidance axis.

* * * * *